(12) United States Patent
Dawkins

(10) Patent No.: US 10,758,018 B1
(45) Date of Patent: Sep. 1, 2020

(54) PROTECTIVE BAG ASSEMBLY

(71) Applicant: Thomas Dawkins, Lake Forest, CA (US)

(72) Inventor: Thomas Dawkins, Lake Forest, CA (US)

( * ) Notice: Subject to any disclaimer, the term of this patent is extended or adjusted under 35 U.S.C. 154(b) by 0 days.

(21) Appl. No.: 16/038,474

(22) Filed: Jul. 18, 2018

(51) Int. Cl.
*A45C 13/00* (2006.01)
*A45C 11/00* (2006.01)
*A45C 13/10* (2006.01)
*B32B 5/04* (2006.01)

(52) U.S. Cl.
CPC ............ *A45C 13/008* (2013.01); *A45C 11/00* (2013.01); *A45C 13/103* (2013.01); *B32B 5/04* (2013.01); *A45C 2011/007* (2013.01); *A45C 2013/1015* (2013.01); *B32B 2250/04* (2013.01); *B32B 2307/3065* (2013.01); *B32B 2439/06* (2013.01); *B32B 2571/02* (2013.01)

(58) Field of Classification Search
CPC ..... A45C 13/008; A45C 11/00; A45C 13/103; A45C 2011/007; A45C 2013/1015; B32B 5/04; B32B 2250/04; B32B 2307/3065; B32B 2439/06; B32B 2571/02
USPC .......................................................... 383/42
See application file for complete search history.

(56) References Cited

U.S. PATENT DOCUMENTS

| | | | | |
|---|---|---|---|---|
| 3,082,713 A * | 3/1963 | Elgin | ....................... | A45C 3/00 109/82 |
| 3,637,000 A * | 1/1972 | Walger | ................... | A45C 13/00 383/61.3 |
| 4,421,150 A | 12/1983 | Masters | | |
| 5,056,603 A * | 10/1991 | Parkinson | ................ | A62C 3/00 169/26 |
| 5,913,607 A * | 6/1999 | Lengyel, Sr. | .......... | A45C 13/00 383/110 |
| 6,299,043 B1 * | 10/2001 | Griffin | ..................... | A62B 1/16 206/389 |
| 7,625,119 B2 * | 12/2009 | Szczesuil | ............... | B65D 33/14 383/41 |
| 8,307,480 B2 * | 11/2012 | Tirpan | ................... | B65D 33/25 5/699 |

(Continued)

FOREIGN PATENT DOCUMENTS

| | | | | | |
|---|---|---|---|---|---|
| JP | 2015128560 A | * | 7/2015 | ............. | A62B 17/04 |
| WO | WO-2013125115 A1 | * | 8/2013 | ............... | A45F 4/12 |

OTHER PUBLICATIONS

Machine translation of the description of JP-2015128560-A.*

*Primary Examiner* — Jes F Pascua
(74) *Attorney, Agent, or Firm* — Sanchelima & Associates, P.A.; Christian Sanchelima; Jesus Sanchelima

(57) ABSTRACT

A protective bag assembly made of multi-layer material for securing one or more articles against natural or man-made disasters, is disclosed. The protective bag assembly comprises an enclosure with an opening. Said bag assembly further comprises a closure secured to the enclosure for fastening the opening and a flap extends over the closure to protect them from exposure to flame and water. The enclosure and flap are made of multi-layer material comprising, a first layer made of silicone material, a second layer made of flame resistant foil, a third layer made of foam material and a fourth layer made of rubber material. The protective bag assembly secures one or more articles against flood water, storm surges, leaky roofs, sand, dust, rodents, insects, flames or any combination thereof.

12 Claims, 4 Drawing Sheets

(56) References Cited

U.S. PATENT DOCUMENTS

| | | | | |
|---|---|---|---|---|
| 9,469,440 B1* | 10/2016 | Flood | ............... | B65D 33/00 |
| 2008/0099290 A1* | 5/2008 | Stern | ............... | A45C 5/03 |
| | | | | 190/109 |
| 2009/0190865 A1* | 7/2009 | Chang | ............... | A45C 3/001 |
| | | | | 383/110 |
| 2012/0008880 A1* | 1/2012 | Toth | ............... | A45C 11/00 |
| | | | | 383/42 |

* cited by examiner

PROTECTIVE BAG ASSEMBLY

BACKGROUND OF THE INVENTION

1. Field of the Invention

The present disclosure relates to a protective bag assembly for securely storing articles. More specifically, the present disclosure relates to a protective bag assembly made of multi-layer materials for securing one or more articles against natural or man-made disasters, for example, flood, fire, earthquake, landslide, explosion, etc.

2. Description of the Related Art

There are numerous circumstances in which there is a need for a compact package or bag that are made of different materials having a large void volume of air contained therein. One such circumstance is on the occasion of natural or man-made disaster, in which a significant number of people are suddenly displaced from their normal residences. Such disasters occur unexpectedly, which provide people with less opportunity to pack and carry articles or things, such as jewels, medical kits, survival kits, or any important documents. For example, when flood or fire occurs, people rush to pack their important things in the bag and carry to a safe place, before they are being damaged by flood waters or flames. Those who are unable to respond quickly incur potentially substantial repair or replacement costs.

Several devices have been designed in the past. None of them, however, include a protective bag assembly that is capable of addressing the foregoing discussed issues.

Applicant believes that a related reference corresponds to U.S. Pat. No. 4,421,150 filed by William E. Masters describes a bag having a waterproof enclosure contained with an outer case having a cover flap, which fastens over a closure by a yieldable fastener to seal an article within the enclosure in airtight waterproof environment. A safety fastener maintains the closure. However, the William reference is designed to provide an airtight waterproof environment, which lacks in ensuring safety during fire.

Another related reference is U.S. Pat. No. 3,637,000 filed by Philip F Walger et al for a fire-resistant bag for carrying valuable documents or money. The Philip reference teaches a bag having a multilayer sidewall with plies, which are separated by heat-insulating air spaces. Each ply includes a sheet of asbestos or similar heat-insulating material, and one ply has a metal-foil outer face for reflecting heat. Philip reference describes about utilizing multilayer wall, however, it does not offer protection to articles against flood and fire hazards.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a flame resistant and waterproof protective bag assembly for articles, such as electronic goods, documents, medical kits, food, clothes and the like.

It is another object of the present invention to provide the protective bag assembly made of a multi-layer material comprising a first layer made of silicone material, a second layer made of flame resistant foil, a third layer made of foam material and a fourth layer made of rubber material.

It is yet another object of the present invention to provide the protective bag assembly comprising the third layer made of a buoyant material to enable the bag assembly to float off in water during flood.

It is yet another object of the present invention to provide the protective bag assembly comprising an enclosure with an opening for storing one or more articles therein.

It is yet another object of the present invention to provide the protective bag assembly comprising a zip fastener secured to the enclosure for fastening the opening.

It is yet another object of the present invention to provide the protective bag assembly comprising a flap disposed over the zip fastener to protect them from exposure to flame and water.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figures 1, 2:
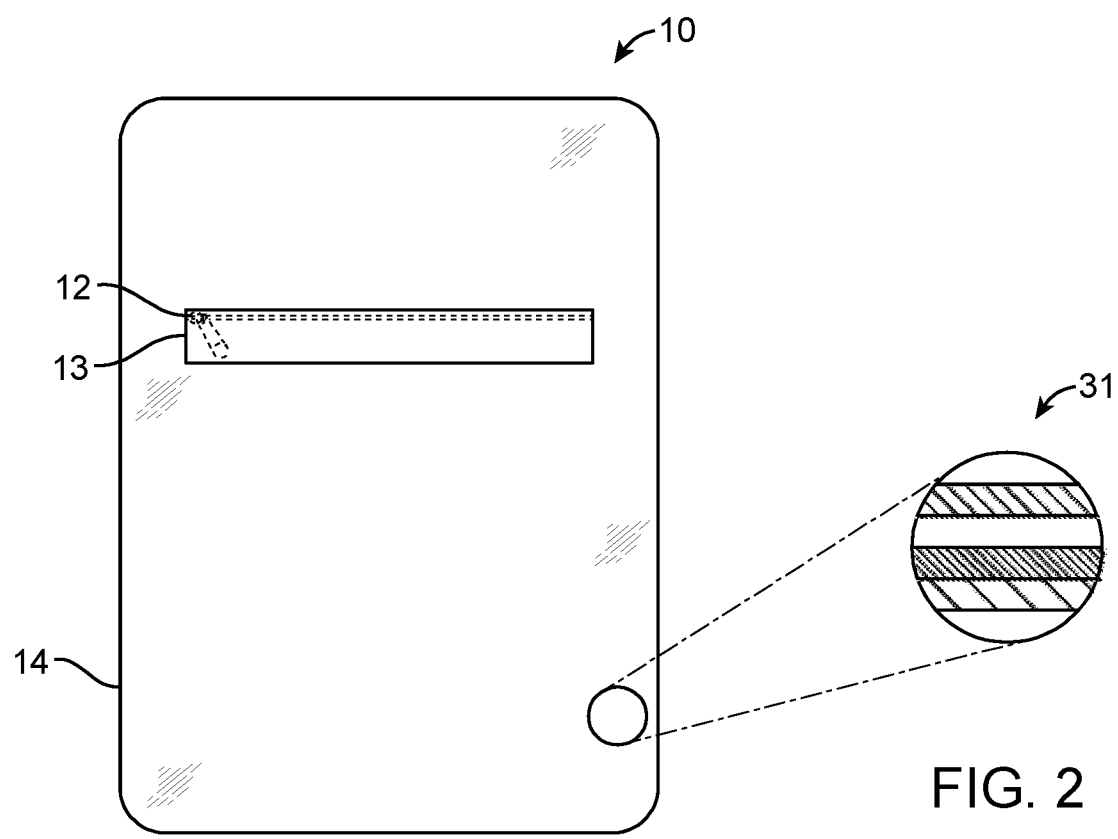
FIG. 1 exemplarily illustrates a front view of a protective bag assembly 10, according to an embodiment of the present invention. The protective bag assembly 10 comprises an enclosure 14 with an opening for storing one or more articles therein, a closure 12 for sealing the opening, and a flap 13 disposed over the closure 12 to protect them from exposure to flame and water is illustrated.
FIG. 2 exemplarily illustrates a detailed view of the protective bag assembly 10 made of a multi-layer material 31, according to an embodiment of the present invention. The multi-layer material 31 configured to provide fire and water resistance characteristics to the bag assembly 10 is illustrated.
Figure 3:
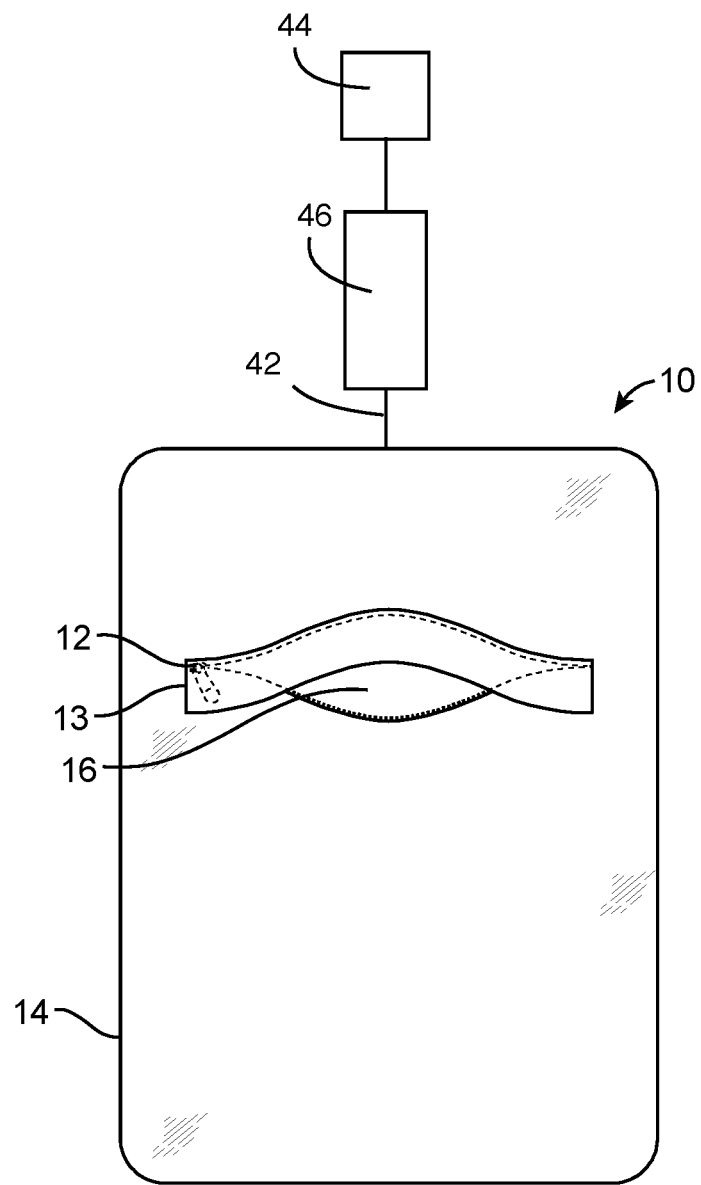
FIG. 3 exemplarily illustrates an open position of the protective bag assembly 10, according to an embodiment of the present invention. The flap 13 is released to open the closure 12 for storing articles in the enclosure 14 is illustrated.
Figure 4:
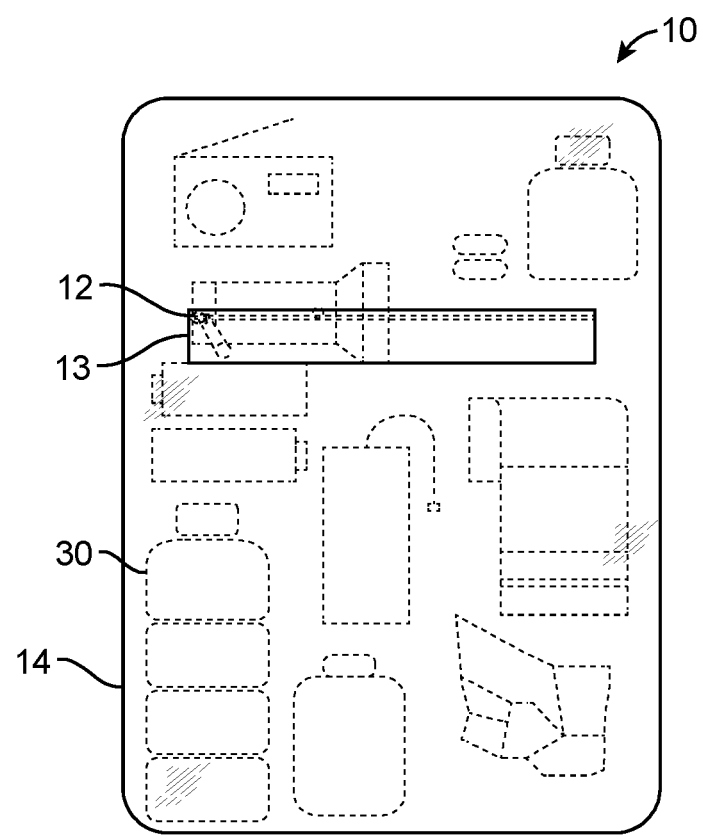
FIG. 4 exemplary illustrates the protective bag assembly 10 storing articles 30, according to an embodiment of the present invention. The protective bag assembly 10 comprising articles 30 such as medical kits, survival kits, food, electronic devices, and documents, is illustrated.
Figure 5:
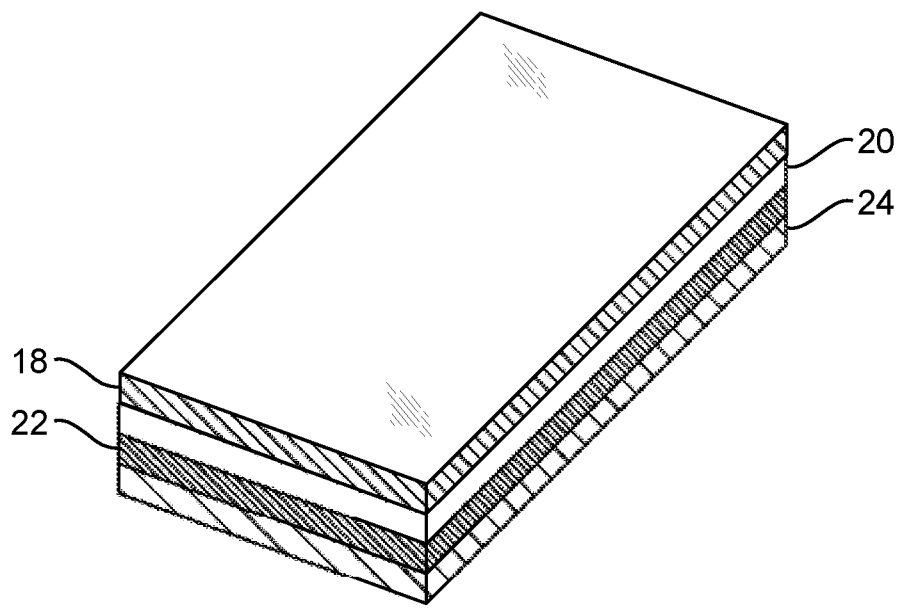
FIG. 5 exemplary illustrates a multi-layer material used in protective bag assembly, according to an embodiment of the present invention. The multi-layer material comprises a first layer 18 made of silicone material, a second layer 20 made of flame resistant foil, a third layer 22 made of foam material and a fourth layer 24 made of rubber material is illustrated.

Referring now to the drawings, FIGS. 1-5, where the present invention is generally referred with numeral 10, it can be observed that a protective bag assembly 10 for storing articles 30, comprises a multilayer wall to provide a waterproof, buoyant, and flame-resistant environment to the articles 30, is disclosed. The multilayer wall defines an enclosure 14 with an opening 16 through which articles 30 are stored. The protective bag assembly 10 further comprises a closure 12, and a flap 13.

The multi-layer wall made of a multi-layer material 31 comprises, a first layer 18 made of silicone material, a second layer 20 made of flame resistant foil, a third layer 22 made of foam material and a fourth layer 24 made of rubber material. In one embodiment, the first layer 18 is a fire resistant outer layer. In one embodiment, the second layer 20 is a fire proof foil. In one embodiment, the third layer 22 is a fire resistant buoyant. In one embodiment, the fourth layer 24 is a waterproof rubber layer. In one embodiment, each layer is sealed to each other in a face-to-face relationship. In one embodiment, the multi-layer material 31 comprises high thermal resistance characteristics. The multi-layer material 31 further comprises a thermal insulator.

The closure 12 is secured across the opening 16 of the enclosure 14. In one embodiment, the closure 12 is a fastener, but not limited to, zip fastener. In one embodiment, the flap 13 extends over the closure 12 to protect the fastener from exposure to flame and water. In some embodiments, the fastener is at least any one of snap fastener, hook and loop fastener, or slide fastener. In one embodiment, the bag assembly 10 could be filled with air therein so as to be buoyant.

In one embodiment, the bag assembly 10 further comprises a cable 42 with a flotation device 44. In another embodiment, a heavy-duty spring assembly 46 is disposed at a middle of the cable 42. The spring assembly 46 is configured to reduce stress imparted on the bag assembly 10 during high water flood. The floatation device 44 enables to locate and obtain information about a user of the bag assembly 10. In one embodiment, the floatation device 44 is dimensioned to match the size of a volleyball and colored with emergency orange color. In some embodiments, the floatation device 44 is colored with brilliant flourescent colors or phosphorescent pigments. In some embodiments, the cable 42 is 10-20 feet or comprises any suitable length. In one embodiment, the spring assembly 46 is a Dw Sp024 heavy-duty spring assembly.

During use of the bag assembly 10, articles 30 are stored in the bag assembly 10, zip fastener is closed and locked securely. The fastener then engages to draw the flaps 13 together, thereby securing the fastener against external environment conditions. The bag assembly 10 provides a high degree of heat insulation and water proof environment for the articles 30 due to the multi-layer material 31 configuration. In one embodiment, the bag assembly 10 of present invention is not limited to the specific shape and size, as shown in FIG. 1A. The bag assembly 10 could be manufactured and customized in any shape and size.

Advantageously, the protective bag assembly 10 is utilized for providing protection against flood water damage, storm surges, leaky roofs, sand, dust, rodents, insects, flames or any combination thereof, for objects, such as electronic devices, jewels, medical kits, survival kits, and documents. By using protective bag assembly 10, a property or business owner could safeguard their important documents, electronic devices, or any other expensive things. The protective bag assembly 10 has several other applications, for example, military use to protect equipment, and weather-related damages. Other applications include the protection and storage of expensive articles 30, ensuring safety even on normal days.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A protective bag assembly, comprising
an enclosure with an opening, said opening being on a front side of said enclosure, said enclosure including four identical and rounded corners, said enclosure configured to store one or more articles, said enclosure including lateral sides, said lateral sides further defined as a left lateral side and a right lateral side;
a closure secured to the enclosure for fastening the opening;
a flap extends over the closure to protect them from exposure to flame and water, wherein the enclosure and flap are made of a multi-layer material, said flap being on said front side, said flap extending below said closure, said flap including a first end and a second end; and
a first spacing and a second spacing, said first spacing defined as the space between said left lateral side of said enclosure and said first end of said flap, said second spacing defined as the space between said right lateral side of said enclosure and said second end of said flap, said closure extending between said first end and said second end of said flap; and a cable with a flotation device mounted to said enclosure, wherein said cable and said flotation device further include a spring assembly disposed at a middle of the cable, the spring assembly configured to reduce stress imparted on the protective bag assembly during high flood water.

2. The protective bag assembly of claim 1, wherein the multi-layer material includes a first layer made of a silicone material.

3. The protective bag assembly of claim 1, wherein the multi-layer material includes a second layer made of a flame resistant foil.

4. The protective bag assembly of claim 1, wherein the multi-layer material includes a third layer made of a foam material.

5. The protective bag assembly of claim 1, wherein the multi-layer material includes a fourth layer made of a rubber material.

6. The protective bag assembly of claim 4, wherein the third layer further includes a buoyant material.

7. The protective bag assembly of claim 1, wherein the closure is a fastener.

8. The protective bag assembly of claim 7, wherein the fastener is a zip fastener.

9. The protective bag assembly of claim 7, wherein the fastener is at least one of a snap fastener, a hook and loop fastener, or a slide fastener.

10. The protective bag assembly of claim 1, wherein the multi-layer material is configured to provide waterproof, buoyant and fire resistance characteristics to the enclosure and flap.

11. The protective bag assembly of claim 1, wherein said closure and said flap are perpendicular to said lateral sides of said enclosure.

12. The protective bag assembly of claim 1, wherein said closure and said flap are parallel to each other.

* * * * *